United States Patent

[11] 3,633,413

[72] Inventor Russell P. Case
 Prospect, Ohio
[21] Appl. No. 58,298
[22] Filed July 27, 1970
[45] Patented Jan. 11, 1972
[73] Assignee National Tractor Pullers Association
 Upper Sandusky, Ohio

[54] DEVICE FOR MEASURING PULLING POWER
 12 Claims, 7 Drawing Figs.
[52] U.S. Cl................................................ 73/141 R
[51] Int. Cl................................................ G01l 3/00,
 G01l 5/12
[50] Field of Search......................... 73/141, 133

[56] References Cited
 UNITED STATES PATENTS
 3,491,590 1/1970 Watkins................... 73/141
 1,603,521 11/1926 Davidson.................. 73/133

Primary Examiner—Richard C. Queisser
Assistant Examiner—John Whalen
Attorney—Henderson & Strom ABSTRACT: A device for measuring the relative pulling power of a power source is provided herein. The device comprises a front portion, generally a motorized cab, and a rear portion, generally a trailer having a weight immovably secured thereon. The rearward end of the trailer is supported by wheels which are movable relative to the rearward end of the trailer and in the opposite direction that the cab is moved. The cab is placed on a sled and the sled is secured to a tractor or other power source. As the tractor pulls the sled forwardly, the trailer wheels move, relative to the trailer, rearwardly thus increasing the load on the sled and measuring the relative pulling power of the tractor by eventually causing the tractor to stall.

INVENTOR
RUSSELL P. CASE
BY
Henderson & Thom
ATTORNEYS

INVENTOR
RUSSELL P. CASE
BY
Henderson + Thom
ATTORNEYS 3,633,413

DEVICE FOR MEASURING PULLING POWER

BACKGROUND OF THE INVENTION

This invention relates to a device for measuring the relative pulling power of a power source. This device is specifically designed for tractor pulling contests but can be adapted for a wide variety of uses.

Tractor pulling contests have been popular for many years. In the typical tractor pull of several years ago, a sled would be attached to the tractor and, as the tractor proceeded forwardly, men would either load the sled with heavy objects or groups of men would stand on the sled until the tractor stalled. This method of measuring the relative pulling power of tractors was very imprecise and required large numbers of people to load and unload the sleds. With the increased horsepower of tractors, this method became quite impractical.

Since that time, several devices for measuring relative pulling power have been utilized among which are: Watkins, U.S. Pat. No. 3,491,590; Drier, U.S. Pat. No. 3,110,176; Botsch, U.S. Pat. No. 2,765,653; Eisenbart, U.S. Pat. No. 2,641,926; Bommarito, U.S. Pat. No. 2,712,234; Davidson U.S. Patent No. 1,603,521; and Burr, U.S. Pat. No. 1,433,067. Some of these devices must be attached to stationary objects, others are difficult to transport, and some are very expensive to build and serve only this single purpose.

The device for measuring relative pulling power of this invention is complete in itself, and can also be utilized to haul equipment from one tractor pulling contest to the next. Additionally this device can be constructed relatively inexpensively.

SUMMARY OF THE INVENTION

This invention relates to a device for measuring the relative pulling power of a power source comprising a sled and a weight transfer vehicle. The vehicle has a front portion which is generally disposed on the sled and a rear portion. The forward end of the rear portion is supported on the front portion and the rear end of the rear portion is supported by wheel means which are movable relative to the rearward end of the rear portion and in the opposite direction that the front portion is moved thereby varying the weight on the front portion. Weight means is immovably secured to the rear portion or merely built into the rear portion.

The principal object of this invention is to provide an improved weight transfer device to measure the relative pulling power of a power source.

Another object is to provide a device to measure relative pulling power which can also be utilized to haul equipment from one tractor pulling contest to another.

Yet another object is to adapt conventional equipment, such as a semitrailer and cab, for use as a weight transfer vehicle.

DESCRIPTION OF THE PREFERRED EMBODIMENTS

Figure 1:
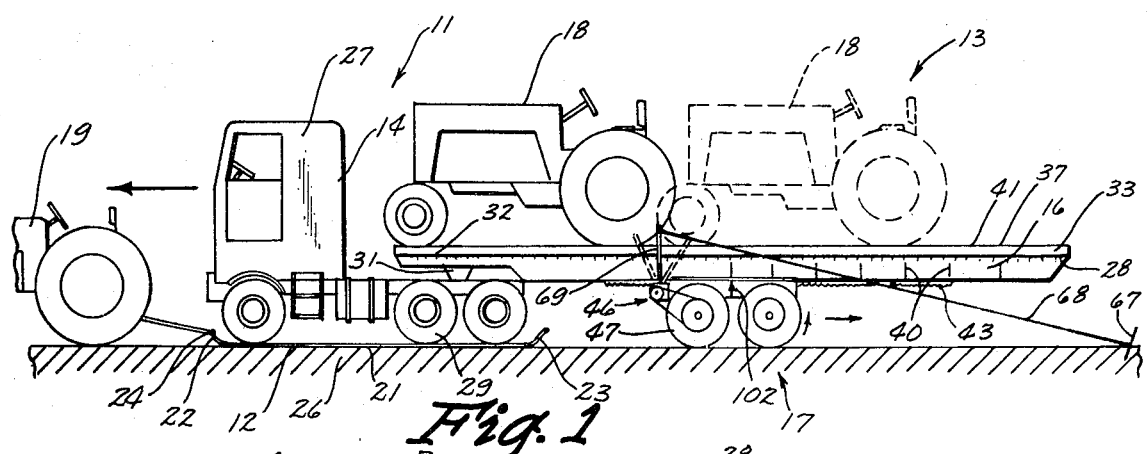
FIG. 1 is a side view of a preferred embodiment of the device of this invention with a tractor being utilized as the weight means and a second tractor being utilized as the power source.
Figure 6:
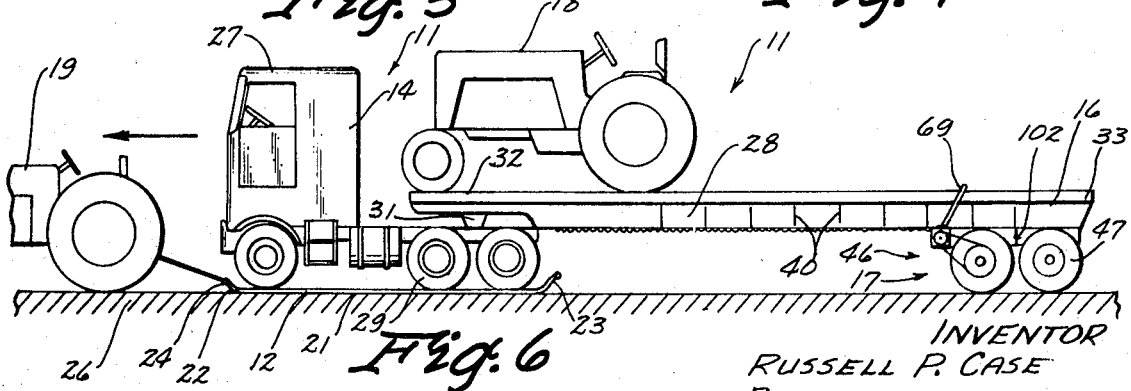
FIG. 6 is a side view of the device of this invention showing the wheel means at the extreme rear of the rear portion or trailer.

Referring now to the drawings, the device for measuring relative pulling power is indicated generally at 11 in FIGS. 1 and 6. This device 11 is comprised of a sled 12, a weight transfer vehicle 13 having a front portion 14 disposed on the sled 12 and a rear portion 16 supported by wheel means 17. Weight means 18 is immovably secured to the rear portion 16.

More specifically, the device 11 of this invention is utilized to measure the relative pulling power of a power source, such as tractor 19. The tractor 19 (FIGS. 1-6) is detachably secured to the sled 12. As the sled 12 is pulled forwardly, the wheel means 17 move rearwardly thereby transferring additional weight onto the front portion 14 of the weight transfer vehicle 13 and increasing the load thereon. When the tractor 19 is stalled, the pulling power of that tractor 19 can be readily compared with other tractors 19 and the positions at which they stall.

The sled 12 (FIGS. 1 and 6) is formed from a flat sheet 21, usually metal, having upturned ends 22 and 23. The sheet 21 is sufficiently wide and long to completely support the front portion 14 of the device 11. At the front end 22 of the sled 12, a securement means 24 is formed for detachably securing the tractor 19 thereto. The securement means 24 can by of any conventional configuration. The rear upturned end 23 can be provided with slots (not shown) formed therein to provide a pathway for driving the front portion 14 onto the sled 12.

The sled 12 is utilized to increase friction between the ground 26 and the front portion 14. By increasing friction in this manner, the weight means 18 can be relatively lighter and provide a heavier load than if no sled 12 was used.

The weight transfer vehicle 13 (FIGS. 1 and 6) is comprised of a front portion 14 and a rear portion 16. As illustrated in FIGS. 1 and 6, the front portion 14 is a semitrailer cab 27 and the rear portion is a semitrailer 28. This invention, however, is not limited to a semitrailer 28 and cab 27 as any conventional truck or a farm tractor and a trailer, for example, could be utilized herein.

The front portion 14 (FIGS. 1 and 6) or cab 27, as illustrated, is disposed on the sled 12 and supports a variable portion of the weight of the rear portion 16. As the wheel means 17 are moved rearwardly in response to front portion 14 being moved forwardly, weight is transferred to the front portion 14. When the wheel means 17 are moved forwardly in response to the front portion being moved rearwardly, weight is transferred from the front portion 14 to the rear portion 16.

The cab 27 (FIGS. 1 and 6) is a conventional semitrailer cab having a motor (not shown), wheels 29 and conventional means 31 for attaching the semitrailer 28 thereto. When not being utilized as a portion of the device 11 of this invention, the cab 27 can be used in its conventional function for pulling the trailer 28 from place to place.

The rear portion 16 or semitrailer 28 (FIGS. 1 and 6) has a forward end 32 and a rearward end 33. The forward end 32 is secured to the front portion 14 by the attaching means 31 and is thereby supported by the front portion 14. The rearward end 33 is supported by the wheel means 17.

The trailer 28 (FIG. 4) is comprised of two parallelly disposed I-beams 34 and 36 extending substantially the length of the trailer 28. A bed 37 is mounted longitudinally on the upper surfaces of the I-beams 34 and 36 for supporting the weight means 18. The I-beams 34 and 36 are secured to the bed 37 by gusset plates 38 and 39. Gradation marks 40 (FIGS. 1-2) are formed along the sides 41 of the bed 37 or along the I-beams 34 and 36 to aid in measuring the relative distance through which the front portion 14 is moved.

Along the lowermost portions 42 of the I-beams 34 and 36 (FIG. 5), rack gears 43 are longitudinally secured by conventional means such as bolts (not shown). The rack gears 43 extend substantially the length of the I-beams 34 and 36 and are centered on the lowermost portions 42 of the I-beams 34 and 36 with the toothed surfaces 44 facing downwardly.

Figure 2:
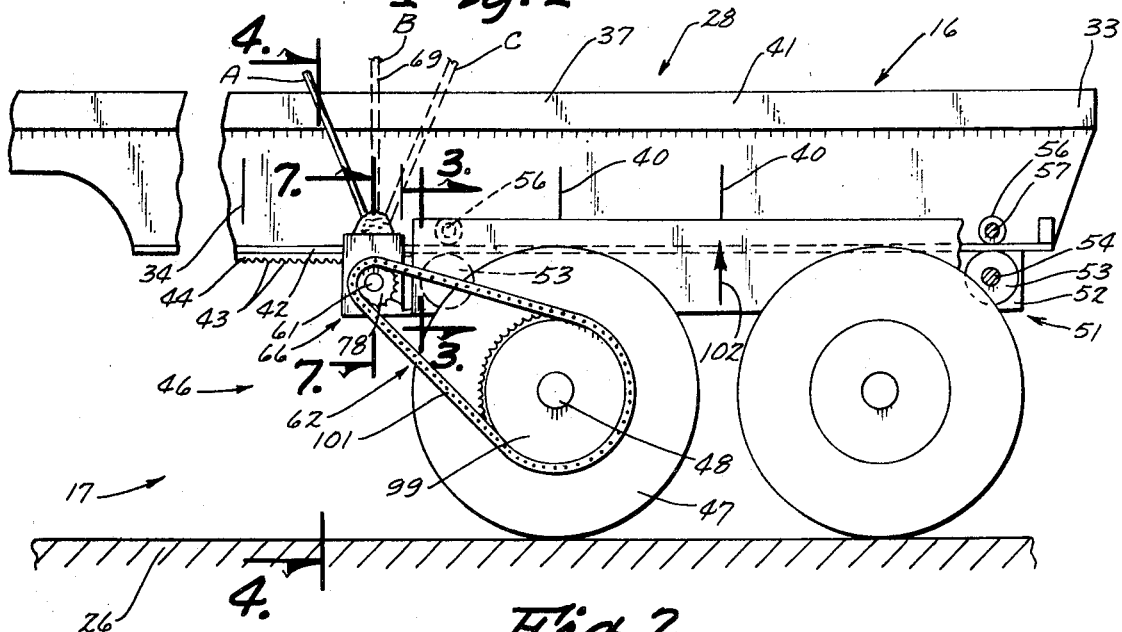
FIG. 2 is an enlarged view of the rear wheel means of the trailer shown in FIG. 1.
Figure 3:
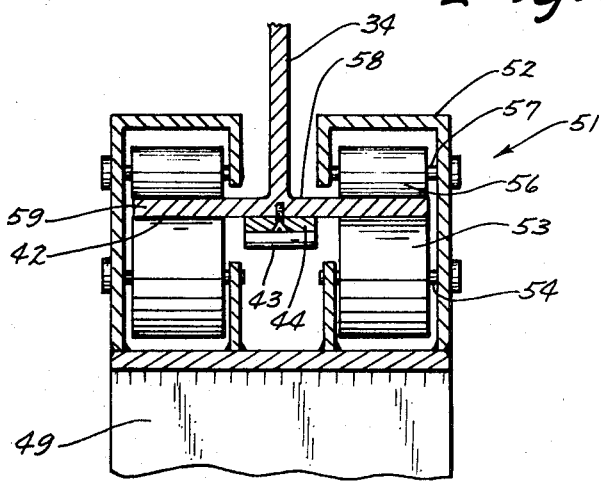
FIG. 3 is a magnified cross-sectional view of the means mounted on the wheel means for rollingly engaging the I-beams under the bed of the trailer taken along line 3—3 of FIG. 2.
Figure 4:
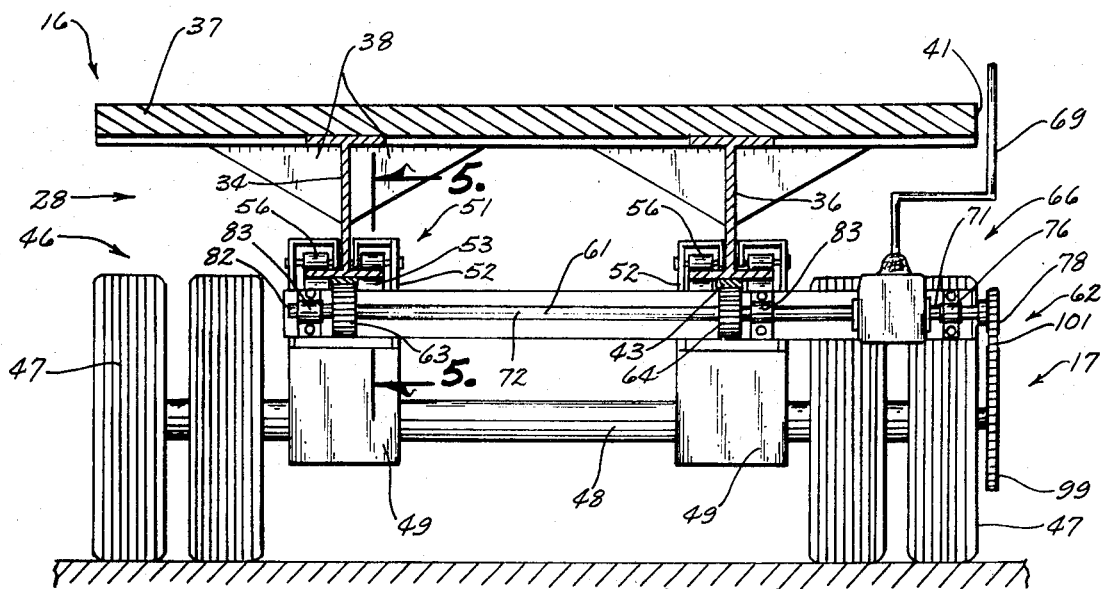
FIG. 4 is an enlarged, cross-sectional view of the trailer taken along line 4—4 of FIG. 2.

The rearward end 33 of the trailer 28 is supported by wheel means 17 (FIGS. 2 and 4). The wheel means 17 are movable, relative to the rearward end 33, and in the opposite direction that the front portion 14 or cab 27 is moved. When the cab 27 is moved forwardly, the wheel means 17 can move rearwardly thus transferring additional weight to the front portion 14. Conversely, when the cab 27 is moved rearwardly, the wheel means 17 can move forwardly.

The wheel means 17 (FIGS 2 and 4) is a movable wheel assembly 46 capable of transferring rotational movement of the wheels 47 to longitudinal movement of the wheel assembly 46 relative to the bed 37 of the trailer 28. The wheel assembly 46 comprises at least two spaced-apart wheels 47 mounted on an axle 48. Mounting means or blocks 49 are secured to the axle 48 between the wheels 47 and in alignment with the I-beams 34 and 36. Conventional spring assemblies (not shown) can be utilized in this assembly 46.

Means 51 (FIGS 2 and 3) are mounted on the mounting blocks 49 for rollingly engaging and supporting the I-beams 34 and 36. The means 51 comprises a frame 52 extending upwardly of each of the mounting blocks 49 and being of substantially U-shaped configuration in cross section. The frames 52 are aligned with the I-beams 34 and 36. Lower rollers 53 are rotatably mounted on the frames 52 on axles 54 secured to the frames 52. The lower rollers 53 rollingly engage part of the lowermost portion 42 of the I-beams 34 and 36. Preferably, the rollers 53 are spaced apart to allow the rack gear 43 to be positioned therebetween. The major portion of the weight of the trailer 28, except that portion supported by the cab 27, is supported by the lower rollers 53. By rollingly engaging the I-beams frictional forces are minimized when moving the wheel assembly 46 relative to the rearward end 33 of the trailer 27.

Upper rollers 56 (FIG. 3) are also rotatably mounted on the frames 52 on axles 57 secured to the frames 52. The upper rollers 56 rollingly engage a portion of the upper surfaces 58 of the lowermost horizontal portions 59 of the I-beams 34 and 36. The upper rollers 56 are utilized to guide the I-beams 34 and 36 and to maintain them in rolling engagement with the lower rollers 53.

Preferably, as shown in FIG. 2, a series of lower rollers 53 and a series of upper rollers 56 are utilized to support and rollingly engage the I-beams 34 and 36.

Shaft means 61 (FIGS. 2, 4, 5 and 7) is rotatably mounted on the mounting blocks 49 or the frames 52, as shown, and is disposed parallely of the axle 48. Means 62 interconnects one of the wheels 47 and the shaft means 61 for transferring rotational movement of the wheels 47 to the shaft means 61. Pinion gears 63 and 64 are rigidly mounted on the shaft means 61 and are aligned with and intermesh with the rack gears 43. Rotational movement is thereby transferrable from the wheels 47 to the pinion gears 63 and 64 and into longitudinal movement of the wheel assembly 46 relative to the rearward end 33 of the trailer 28.

Figures 5, 7:
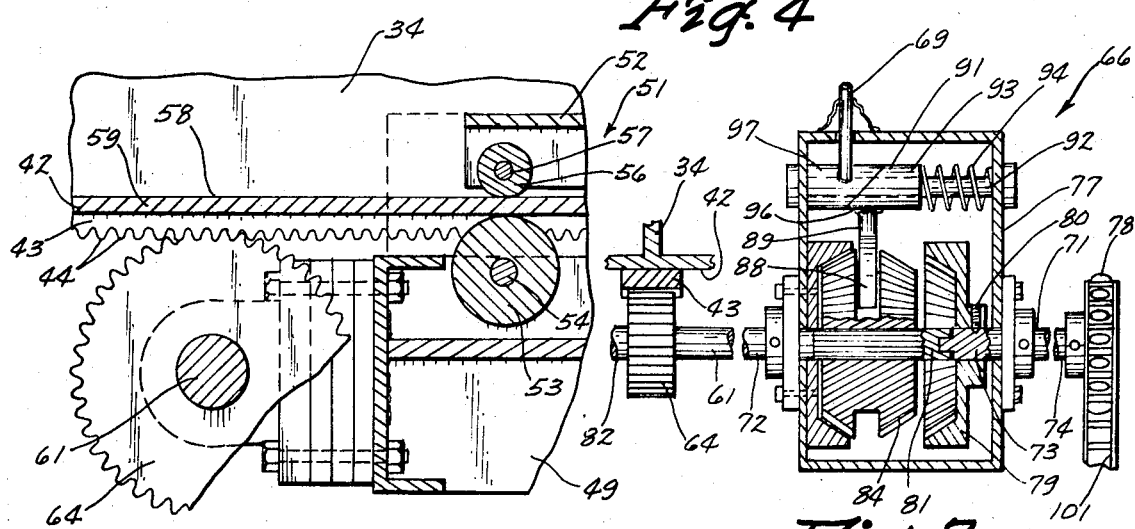
FIG. 5 is a magnified, cross-sectional view taken along line 5—5 of FIG. 4 with a portion of the pinion gear cut away.
FIG. 7 is a magnified, cross-sectional view of the gearbox with the shaft foreshortened and portions of the ring gear and double pinion gear cut away to show the split shaft.

A gearbox means 66 is secured on the shaft means 61 (FIG. 7). The gearbox means 66 has an engaged position, a neutral position and, generally, a locked position. In the engaged position, rotational movement is transferred from the wheels 47 to the pinion gears 63 and 64 through the shaft means 61. In the neutral position, the wheels 47 and the pinion gears 63 and 64 can rotate independently of each other while in the locked position, the pinion gears 63 and 64 are locked in position and the wheels 47 are free to rotate. The locked position is primarily used in over the road travel to secure the wheel assembly 46 in a fixed relation relative to the bed 37 of the trailer 28. Bolts (not shown) can be utilized, in addition, to secure the bed 37 in fixed relation to the wheel assembly 46.

When the device 11 is utilized in a tractor pulling contest, a stake 67 (FIG. 1) is driven into the ground and a line 68 is secured between the stake 67 and a lever 69 secured in the gearbox means 66. As the sled 12 is pulled forwardly, the line 68 tightens and moves the lever 69 from its locked or forwardmost position A (FIG. 2), to the neutral or upright position B, and finally to the engaged position C. In the engaged position C, the wheel assembly 46 moves rearwardly as the cab 27 moves forwardly. Weight is thereby continuously added to the sled 12 until the tractor 19 stalls.

More specifically, the shaft means 61 (FIGS. 4 and 7) is a split shaft, that is, it is formed as two separate, mating shafts 71 and 72. The first section 71 has an interior end 73 and an exterior end 74 and is rotatably mounted in bearings 76. The first section 71 extends from inside the gearbox 77 outwardly and is longitudinally aligned with the outside wheel 47. A circular toothed gear 78 is rigidly mounted on the exterior end 74 of the first section 71 and a ring gear 79 is rigidly secured to the interior end 73 by a setscrew 80 or the like inside the gearbox 77. The second section 72 has an interior end 81 and an exterior end 82 and is aligned with the first section 71 and rotatably mounted on bearings 83. The interior end 81 mates with the interior end 73 of the first section 71 and is splined to rotatably secure the double bevel gears 84 thereon but to allow the double bevel gears 84 to move longitudinally on the shaft 72. Two pinion gears 63 and 64 are rigidly mounted on the shaft 72 and are aligned with and intermesh with the rack gears 43.

The gearbox 77 (FIG. 7) contains the interior, mating ends 73 and 81 of the shafts 71 and 72 and the ring gear 79 and double bevel gears 84. A second ring gear 86 is secured, by conventional means, to the interior side 87 of the gearbox 77 and in alignment with the double bevel gear 84. The shaft 72 passes through the center of the second ring gear 86 but is not secured thereto. The double bevel gear 84 can be moved longitudinally on the splined shaft 72 into engagement with either of the ring gears 79 and 86.

The double bevel gear 84 (FIG. 7) is moved by a yoke 88 disposed intermediate the bevel gears 84. The yoke 88, at its upper end 89, is rigidly secured to a tube 91 which encircles a pin 92 extending through the gearbox 77. The tube 91 is free to move longitudinally on the pin 92. One end 93 of the tube 91 has a coil spring 94 extending outwardly therefrom to the gearbox wall thereby forcing the tube 91, the bevel gears 84 inwardly into the locked position, Position A. The other end 96 of the tube is cut at an angle and is juxtaposable with a second tube 97 which is also cut at a mating angle with the other end 96 and is juxtaposable therewith. When the second tube 97 is rotated by the lever 69, the first tube 91 is moved longitudinally outwardly on the pin 92 thus moving the bevel gears 84 into, first, the neutral position and, then, the engaged position. A keeper of conventional design (not shown) can be utilized to hold the lever 69 in any desired position.

A second circular toothed gear 99 is rigidly affixed to the outside wheel 47 and aligned with the first toothed gear 78. A link chain 101 connects the toothed gears 78 and 99 and thereby transmits rotational movement from the wheel 47 to the shaft 71.

A pointer 102 can be painted or otherwise affixed to the wheel assembly 46. The pointer 102 indicates the starting and finishing position relative to the gradations 41 on the trailer 28. The gradations 41 are calculated to indicate the distance through which the front portion 14 is moved.

The weight means 18 can be any suitable weight or can merely be built into the trailer 28. However, as shown in FIG. 1, a tractor 103 can be utilized as the weight means 18. The tractor 103 can be placed forwardly on the bed 37 of the trailer 28 when powerful tractors 19 are being utilized as the power source. With smaller tractors 19, the tractor 103 can be moved rearwardly to provide a smaller initial load. During the pull, the tractor 103 should be maintained in a stationary position.

Although a preferred embodiment has been described, it is to be remembered that various modifications may be made without departing from the invention as defined in the appended claims.

I claim:

1. A device for measuring the relative pulling power of a power source comprising:
   a sled detachably securable to the power source;
   a weight transfer vehicle having a front portion and a rear portion,
      said front portion being disposed on said sled and supporting a variable portion of the weight of said rear portion;

said rear portion having a forward end and a rearward end, said forward end being supported by said front portion; and said weight transfer vehicle having wheel means supporting said rearward end of said rear portion, means for moving said wheel means relative to said rearward end and in the opposite direction that said vehicle is moved in response to motion of said vehicle thereby varying the weight on said front portion; and weight means immovably secured to said rear portion.

2. The device of claim 1 wherein said rear portion comprises:

two I-beams parallelly disposed;
a bed mounted longitudinally on said I-beams
a rack gear secured longitudinally to the lowermost portion of each of said I-beams and wherein said wheel means comprises:
an axle;
at least two spaced-apart wheels mounted on said axle;
mounting means secured to said axle;
means mounted on said mounting means for rollingly engaging and supporting said I-beams
shaft means rotatably mounted on said mounting means parallel of said axle;
a pinion gear aligned with and intermeshing with each of said rack gears; said pinion gears being rigidly mounted on said shaft means;
means interconnecting one of said wheels and said shaft means for transferring rotational movement from said wheel to said shaft means.

3. The device of claim 2 wherein gearbox means is secured on said shaft means; said gearbox means having an engaged position and a neutral position, said gearbox means in engaged position transmitting rotational movement from said wheel to said pinion gear through said shaft means and, in said neutral position, allowing the wheel or the pinion gear to rotate without transmission of rotational movement one to the other through said shaft means.

4. The device of claim 3 wherein said rack gears extend substantially the entire length of said I-beams.

5. The device of claim 4 wherein said means for rollingly engaging said I-beams comprises:

a frame mounted on said mounting means and extending upwardly thereof and aligned with said I-beams
lower rollers rotatably mounted on said frame for supporting said I-beams and rollingly engaging a portion of the lower surface of the lowermost horizontal portion of said I-beams
upper rollers rotatably mounted on said frame for rollingly engaging a portion of the upper surface of the lowermost horizontal portion of said I-beams 6. The device of claim 5 wherein said mounting means is a mounting block secured to said axle.

7. The device of claim 6 wherein said shaft means comprises a split shaft, one exterior end of said shaft having said pinion gears mounted thereon.

8. The device of claim 7 wherein said means interconnecting said wheels and said shaft comprises:

a circular toothed gear rigidly secured to said wheel;
a second circular toothed gear rigidly secured to the other exterior end of said split shaft;
an endless link chain engaging said gears for transferring rotational movement from said wheel to said split shaft.

9. The device of claim 8 wherein said gearbox means comprises:

a gearbox casing enclosing the interior ends of said split shaft;
a ring gear rigidly secured to said split shaft on the portion having the toothed gear secured thereto;
a second ring gear rigidly secured to said casing adjacent the pinion gear, said shaft rotatably passing through the center of said second ring gear;
a double bevel gear splined on said split shaft between said ring gears and movable into engagement with either of said ring gears;
means for moving said bevel gears into engagement with either of said ring gears.

10. The device of claim 9 wherein said means for moving said bevel gears comprises:

a yoke disposed between said bevel gears;
a handle secured to said yoke for moving said bevel gear into engagement with either of said ring gears.

11. The device of claim 10 wherein said front portion is a motorized cab.

12. The device of claim 11 wherein gradations are marked on the bed, said gradations measuring the relative distance through which said front portion of said weight transfer means is moved; and a pointer affixed to said wheel means for indicating on said gradations the relative distance through which said front portion is moved.

* * * * *